United States Patent [19]

Kramer et al.

[11] 3,866,219
[45] Feb. 11, 1975

[54] RADAR SYSTEM WITH TARGET ILLUMINATION BY DIFFERENT WAVEFORMS

[75] Inventors: David A. Kramer, Canoga Park; George P. Lavas, Torrance, both of Calif.

[73] Assignee: Hughes Aircraft Company, Culver City, Calif.

[22] Filed: July 5, 1973

[21] Appl. No.: 376,858

[52] U.S. Cl. ...... 343/5 R, 343/17.1 R, 343/17.1 PF
[51] Int. Cl. ............................ G01s 9/02, G01s 7/28
[58] Field of Search .... 343/17.1 PF, 17.1 R, 106 R, 343/5 R

[56] References Cited
UNITED STATES PATENTS

| | | | |
|---|---|---|---|
| 2,874,379 | 2/1959 | Page | 343/11 |
| 3,023,409 | 2/1962 | Smith et al. | 343/13 |
| 3,341,847 | 9/1967 | Fried et al. | 343/7.5 |
| 3,491,360 | 1/1970 | Stoorvogel | 343/17.1 PF |

Primary Examiner—Maynard R. Wilbur
Assistant Examiner—G. E. Montone
Attorney, Agent, or Firm—Walter J. Adam, W. H. MacAllister, Jr.

[57] ABSTRACT

In an acquisition radar system of the type in which the antenna scans in a multiple-bar raster scan pattern, signals of different sets of characteristics, e.g., different PRF's, are transmitted on adjacent bars. The elevation bar spacing is chosen to be less than $0.5 \times \theta_b$ where $\theta_b$ is the antenna 3dB elevation beamwidth so that any target within the pattern is illuminated by the signals of the different PRF's.

5 Claims, 4 Drawing Figures

RADAR SYSTEM WITH TARGET ILLUMINATION BY DIFFERENT WAVEFORMS

The invention herein described was made in the course of or under a Contract or Subcontract thereunder with the Department of the Air Force.

BACKGROUND OF THE INVENTION

The present invention generally relates to a radar system, and more particularly, to a radar system in which an antenna scans an angular sector at one or more different elevations.

In any aquisition radar system, it is necessary for the radar to search the volume of space in which the presence of a target is suspect. The searching is often done by moving the antenna, which transmits the radar signals and receives the radar returns, in a selected aquisition search pattern. One such pattern is known as a raster or TV scan. In it, the antenna scans a given angular or azimuth sector in one direction, e.g., from left to right at one elevation and at the end of the sector the antenna elevation is changed, and the antenna is moved in the opposite direction. Each scan at a constant elevation is sometimes referred to as a bar and the complete pattern of several bars is often called a frame or a multiple-bar raster scan. In some radar systems, using such a scan pattern divergent radar requirements are frequently imposed, whereby the application (transmission) of one radar waveform, e.g., high, medium or low PRF provides some desired information, while the application of another waveform is required to provide additional information.

One obvious way of illuminating a target with both waveforms is to time share the two waveforms within each elevation (bar) at fast enough rate so that as the antenna scans the azimuth sector containing the target, the latter is illuminated by both waveforms. There are several disadvantages for such a scheme. It complicates the signal processing as well as the interfacing between any computer, used in such a system, the signal processor and the display. Another major disadvantage of such a system is decreased system sensitivity. This is due to increased system 'dead time' which generally refers to the time when the system cannot process target returns. In such a system, target returns cannot be processed during the finite time when switching from one waveform to the other takes place and during the time required to stabilize the system. Thus, dead time is increased and overall sensitivity is decreased.

OBJECTS AND SUMMARY OF THE INVENTION

It is a primary object of the present invention to provide improvements in a radar system in which an antenna multiple-bar raster scan is employed and in which each target is to be illuminated with two distinct waveforms.

Another object of the invention is to provide a radar system employing an antenna multiple-bar raster scan and in which each target is to be illuminated by two waveforms without increasing dead time.

A further object of the invention is to provide a new method of illuminating targets with two distinct waveforms transmitted from an antenna scanned in a raster scan of one or more bars.

These and other objects of the invention are achieved in a radar system wherein a multiple-bar antenna raster scan is employed by choosing the elevation bar spacing such that when one waveform is employed on one bar, and the other waveform is employed on adjacent bars, a target in the antenna raster scan is illuminated by both waveforms.

DESCRIPTION OF THE PREFERRED EMBODIMENTS

Figure 1:
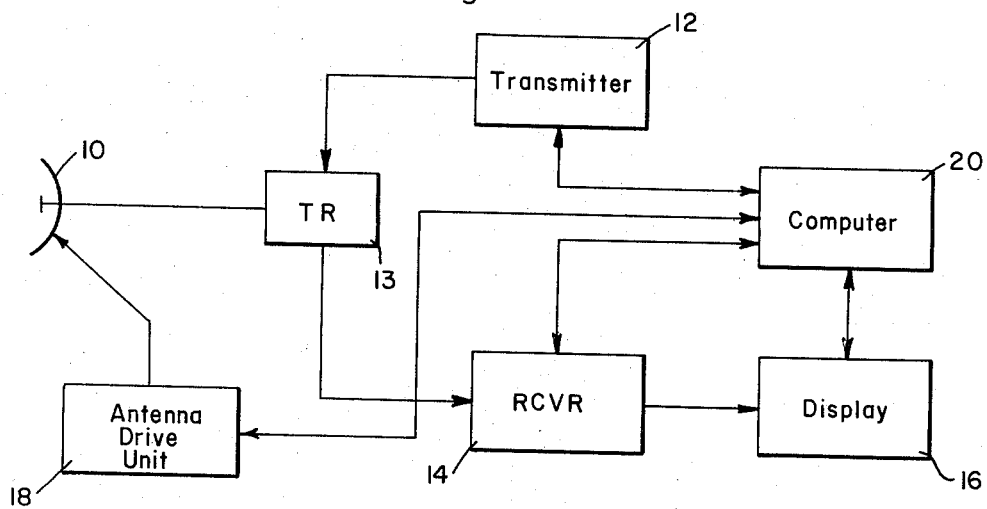
FIG. 1 is a general block diagram of a radar system in which the present invention is incorporated.
Figure 2A:
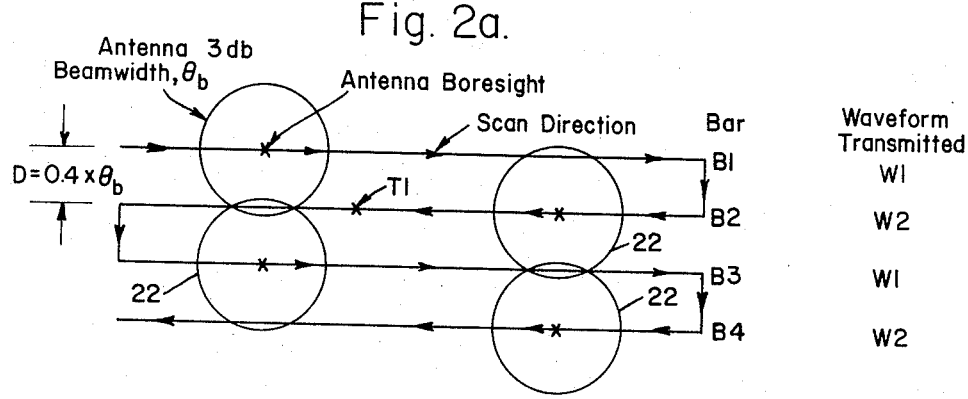
FIGS. 2a and 2b are diagrams of antenna multiple-bar raster scan patterns useful in explaining the invention.

Attention is first directed to FIGS. 1 and 2a which will be used to describe the basic principles of the invention and one embodiment thereof. FIG. 1 is a general block diagram of a radar system including an antenna 10 which transmits radar signals, received from a transmitter 12 through a transmit-receive (TR) unit 13. Radar returns, received by the antenna 10, are directed by TR unit 13 to a receiver 14, wherein they are processed and assumed to be displayed by display 16. Connected to the antenna 10 is an antenna drive unit 18 which controls the antenna motion and thereby controls the antenna scan pattern. In present-day advanced radar systems, a computer 20 is generally included. As is known, the computer controls the operations of the various subsystems of the radar system, such as the transmitter, the receiver, the antenna drive unit and the display in addition to taking part in processing the radar returns.

In the embodiment presently described, antenna drive unit 18 is assumed to move the antenna 10 in a multiple-bar raster scan pattern as shown in FIG. 2a. Therein, the raster scan is shown limited to four bars for explanatory purposes only. The four bars are designated as B1–B4, with the various arrows indicating scan direction. As shown, in the odd-numbered bars, such as B1 and B3, the antenna moves from left to right. At the end of each of these bars, it is lowered in elevation and is moved from right to left in each of the even-numbered bars.

In accordance with the present invention, signals of different properties such as signals at different PRF's, hereinafter referred to as different waveforms, are transmitted by the antenna on adjacent bars. The elevation bar spacing, designated D, is chosen so that any target within the complete raster scan or frame is illuminated by both waveforms. For explanatory purposes, a waveform designated W1 is assumed to be transmitted on the odd-numbered bars and waveform W2 on the even-numbered bars. In FIG. 2a, the x's and the circles 22, respectively represent the antenna boresight and its 3dB elevation beamwidth, $\theta_b$ at different positions of the antenna in the raster scan.

Let it be assumed that a target T1 is located in elevation exactly on the center of bar B2. Such a target is clearly illuminated by waveform W2 during the antenna scan in bar B2, with a peak antenna gain, thus enhancing the detection probability by waveform W2. As seen from FIG. 2a, the elevation spacing D between bars is chosen so that the same target T1 is also illuminated by waveforms W1 during the antenna scan in bars B1 and B3. The target illumination by waveform W1 is with less than the peak gain. However, since the target is illuminated by waveform W1 twice, on bars B1 and B3, the increased sensitivity, resulting from these two detection opportunities, offsets the decreased antenna gain. By proper selection of the elevation bar spacing target sensitivity to both waveforms can be made to be essentially equal.

It should be apparent that for any target to be illuminated by both waveforms, the elevation bar spacing D must be less than $0.5 \times \theta_b$. Typically, when a single waveform is transmitted, as is the case in the prior art, the bar spacing is greater than $0.5 \times \theta_b$. For example, with a 2.5 degree antenna elevation beamwidth, a 1.5 degree bar spacing is employed, i.e., the bar spacing is $0.6 \times \theta_b$. The simultaneous illumination of the target by the two waveforms in the same frame in accordance with the present invention is achieved at the price of more restricted elevation coverage since in the present invention, the bar spacing must be less than $0.5 \times \theta_b$.

Figure 2B:
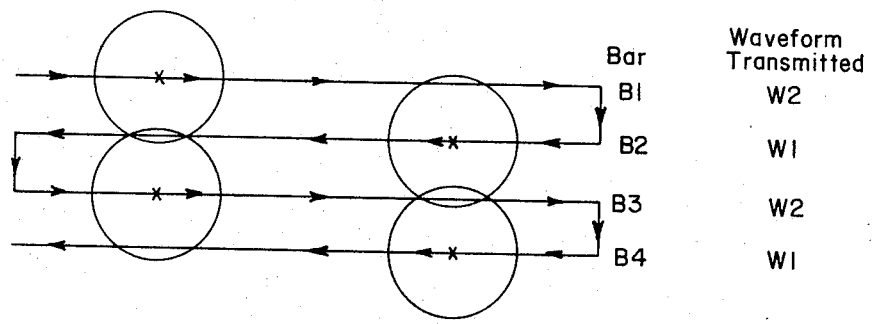

Assuming a bar spacing of $0.4 \times \theta_b$ and a 2.5 degree antenna elevation beamwidth, in accordance with the present invention, the bar spacing as 1 degree. Thus, the total elevation coverage, excluding edge effects is 3 degrees for a 4-bar scan pattern. The scan pattern edges above B1 and below B4 are scanned only with waveforms W1 and W2 respectively, the elevation angle coverage of each edge being 1.25 degrees. Each of these edges may be covered by both waveforms by repeating the scan pattern with a subsequent frame as shown in FIG. 2b in which the waveform W2 is transmitted on each odd-numbered bar and a waveform w1 on each even-numbered bar. The total elevation angle coverage for both waveforms is thus $3 + 2.5 = 5.5$ degrees. This compares with a 7 degree elevation angle coverage generally achievable in the prior art with a similar antenna and with a bar spacing of 1.5 degrees ($0.6 \times \theta_b$).

It should be stressed that in the present invention, switching between waveforms occurs when the antenna is lowered in elevation from one bar elevation to the next. During this time, a radar system typically does not process data in any event. Thus, system dead time is not increased above the characteristic of prior art systems in which targets are illuminated by one waveform. It should also be stressed that since in the present invention, each waveform is held for a full bar, signal processing and unit interface complexity is minimized.

Figure 3:
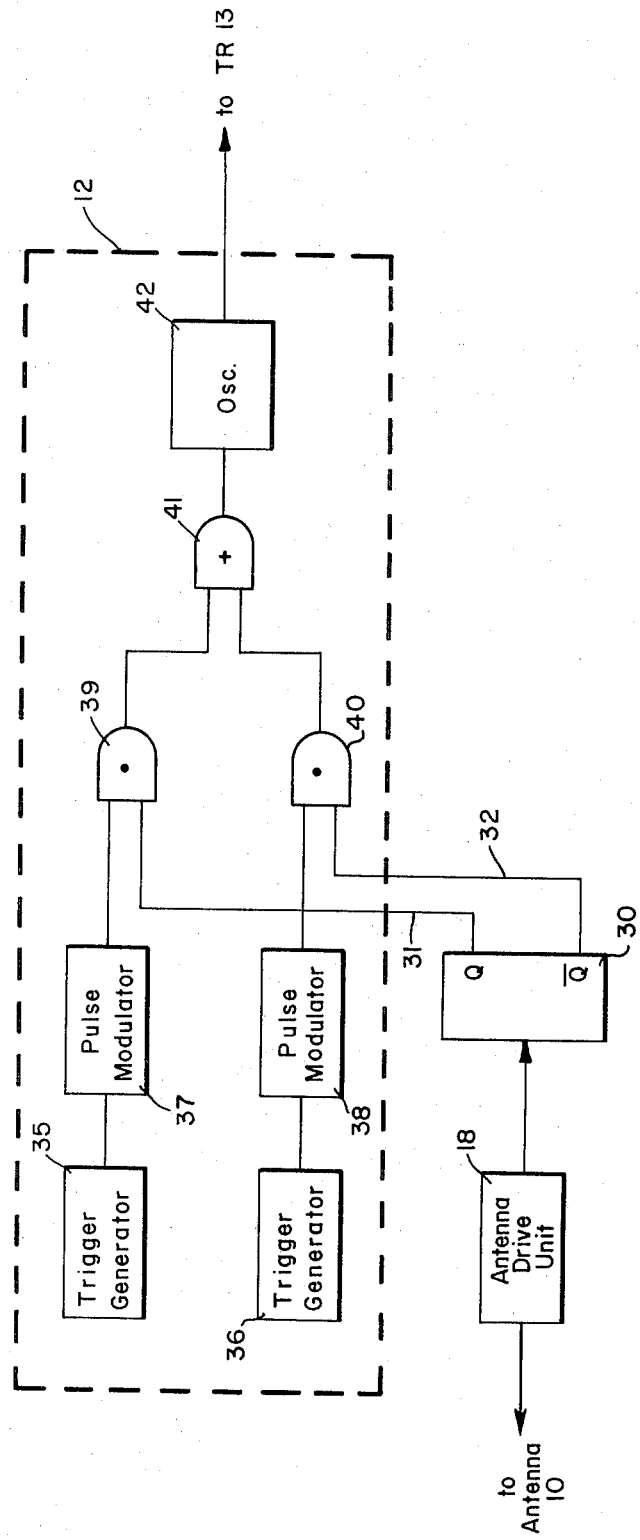
FIG. 3 is a simple block diagram of one implementation of the teachings of the present invention.

Based on the foregoing description, it should be apparent to those familiar with the art that the specific implementation to control different waveforms to be transmitted on succeeding bars depends on the specific subsystems and the manner in which they interact. In a system in which a computer, such as computer 20, is used to control the various subsystems, the computer may be used to provide a signal to the transmitter 12 to transmit one waveform on one bar and a different waveform on the succeeding bar. In a system in which the antenna drive unit 18 operates independently of a computer, the drive unit 18 may incorporate appropriate means to supply control signals to the transmitter so that different waveforms are transmitted on succeeding bars. Such an arrangement is shown in FIG. 3.

Therein numeral 30 designates a flip-flop (FF) which is connected to unit 18. During the scan frame, shown in FIG. 2a, the FF 30 is assumed to be set by unit 18 when the antenna is moved in one scan direction, e.g., from left to right and reset when the antenna moves from right to left. The Q and $\bar{Q}$ outputs of FF 30 are respectively true when the flip-flop is in the set and reset states. These outputs are connected to transmitter 12 by lines 31 and 32.

For explanatory purposes, the transmitter is shown including two trigger generators 35 and 36, two pulse modulators 37 and 38, two AND gates 39 and 40, an OR gate 41 and an oscillator 42. Oscillator 42 produces one PRF defined as W1 when the output of modulator 37 is supplied to oscillator 42 through gates 39 and 41, while a second PRF or W2 is supplied by the oscillator when the output of modulator 38 is supplied thereto via gates 40 and 41. Since FF 30 is set only when the antenna moves from left to right, only gate 39 of gates 39 and 40 is enabled. Thus, the transmitter provides waveform W1. Then, when the antenna moves from right to left, FF 30 is reset so that gate 40 is enabled and therefore the transmitter output is waveform W2. During the subsequent scan frame as shown in FIG. 2b, the unit 18 resets the FF 30 when moving the antenna from left to right and sets the flip-flop when the antenna moves from right to left. Thus, waveform W2 is transmitted on each odd-numbered bar and w1 is transmitted on each even-numbered bar.

The teachings herebefore described are applicable for a bar scan pattern of any number of bars and is not intended to be limited to the 4-bar patterns shown in FIGS. 2a and 2b. The teachings are likewise applicable to a 1-bar scan pattern. In such a pattern, W1 may be used when the antenna moves in one direction and W2 may be used when the antenna scans in the opposite direction.

Although herebefore the invention has been described as consisting of an arrangement whereby different waveforms are transmitted on succeeding bars of a multiple-bar scan pattern, or in a 1-bar scan pattern as a function of antenna direction of movement, the invention is not intended to be limited thereto. For example, in some applications separate pulse compression doppler tuning is necessary for nose and tail targets. Thus, instead of using two processors, separate bar-to-bar tuning may be employed with the returns from one bar used for nose tuning and the returns from a succeeding bar used for tail tuning. In such a case, instead of using the control signals from the FF 30, controlled by the antenna drive unit, or the computer to control the transmitter to transmit different waveforms, these control signals can be used to control the signal processing. Similarly, for an all-high PRF system, the signal processor could be reduced in half by processing the clutter and clutter-free frequency regions on a bar-to-bar basis with the clutter region regarded as W1 and the clutter-free region as W2.

In summary, in accordance with the present invention, when incorporated in a radar system in which the antenna is moved in a multiple bar scan pattern, control signals are provided to control different waveforms to be transmitted on successive bars or to control the signal processing on a bar-to-bar basis. In a system with a single bar scan pattern, the control signals are used to transmit different waveforms or control signal processing as a function of the direction of movement of the antenna.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a radar system of the type including an antenna movable in a multiple-bar scan pattern, transmitting means for directing signals to said antenna which are transmitted thereby, receiving means including signal processor means coupled to said antenna for receiving and processing signals received by said antenna, an arrangement comprising:

means for controlling said antenna to move in a scan pattern of a sequence of bars at different elevations, defining odd and even bars, said antenna being selected to be characterized by an elevation beamwidth definable as $\theta_b$ and the elevation spacing between adjacent bars is $n \times \theta_b$ where $n$ is less than 0.5;

control means coupled to said antenna and to said transmitting means for controlling the latter to direct signals of different characteristics during successive bars of said scan pattern; and control means controlling said transmitting means to direct signals of a first set of properties, definable as a first waveform, to said antenna during each odd bar and to direct signals of a second set of properties, definable as a second waveform, to said antenna during each even bar.

2. The system as described in claim 1 wherein n is on the order of 0.4.

3. In radar system of the type including an antenna movable in first and second opposite directions at least one elevation, said system further including transmitting means for supplying signals to said antenna which are transmitted thereby, and receiver and processing means for receiving and processing signals received by said antenna, an arrangement comprising:

first means coupled to said antenna for controlling the direction of movement of said antenna to move at a plurality of successive elevations in a multiple-bar raster scan pattern, each bar being at a different elevation, with said antenna moving in opposite directions along adjacent bars in said pattern, said antenna being characterized by an elevation beamwidth definable as $\theta_b$, and the elevation spacing between successive elevations being less that $0.5 \times \theta_b$; and second means coupled to said first means for controlling either said transmitting means or said receiver and processing means as a function of the antenna's direction of movement, said second means controlling said transmitting means to supply to said antenna for transmission signals of a first set of characteristics, defining a first waveform, when said antenna is moved in said first direction and signals of a selected set of characteristics, defining a second waveform, when said antenna is moved in said second direction.

4. The system as described in claim 3 wherein said second means control said transmitting means to supply to said antenna for transmission signals of a first set of characteristics, defining a first waveform, when said antenna is moved in said first direction, and signals of a second set of characteristics, defining a second waveform, when said antenna is moved in said second direction.

5. The system as described in claim 4 wherein the elevation spacing is on the order of $0.4 \times \theta_b$.

* * * * *